United States Patent [19]
Orme et al.

[11] Patent Number: 5,248,979
[45] Date of Patent: Sep. 28, 1993

[54] DUAL FUNCTION SATELLITE IMAGING AND COMMUNICATION SYSTEM USING SOLID STATE MASS DATA STORAGE

[75] Inventors: Gordon R. Orme, Rancho Palos Verdes; Thomas J. Gritzmacher; Timothy A. Yokote, both of Torrance, all of Calif.

[73] Assignee: TRW Inc., Redondo Beach, Calif.

[21] Appl. No.: 799,794

[22] Filed: Nov. 29, 1991

[51] Int. Cl.$^5$ ............................................. G01S 13/86
[52] U.S. Cl. ....................... 342/58; 342/352; 358/109; 359/145
[58] Field of Search ............... 342/57, 58, 60, 352

[56] References Cited
U.S. PATENT DOCUMENTS 3,550,124 12/1970 Heft et al. .................. 342/60 X
4,733,238  3/1988 Fiden ........................ 342/60

Primary Examiner—T. H. Tubbesing
Attorney, Agent, or Firm—James M. Steinberger; G. Gregory Schivley; Ronald L. Taylor

[57] ABSTRACT

The present invention discloses a dual function satellite imaging and communication system (10, 40, 50, 60) using a solid state mass data storage device (30) which generates and stores image data at a relatively low data rate and subsequently transmits the data at a significantly higher data rate. The dual function imaging and communication system (10, 40, 50, 60), which may be incorporated as a body mounted payload of an imaging satellite, provides a single antenna or aperture (28, 54, 62) to perform both the imaging and communication functions and simplify the imaging and communication systems of the imaging satellite by eliminating the requirement for a separately gimballed antenna and/or aperture for each system. Further, the present invention is designed to operate in a low duty cycle mode to minimize its power supply requirements. In short, the present invention combines and simplifies the imaging and communication systems of an imaging satellite to reduce the weight of the payload and, at the same time, improve the reliability.

16 Claims, 2 Drawing Sheets

DUAL FUNCTION SATELLITE IMAGING AND COMMUNICATION SYSTEM USING SOLID STATE MASS DATA STORAGE

BACKGROUND OF THE INVENTION

1. Technical Field

The present invention relates to imaging satellites and, more particularly, to a dual function satellite imaging and communication system using solid state mass data storage.

2. Discussion

Surveillance of the Earth from spaceborne platforms, or satellites, provides visual access to large portions of the Earth that are otherwise inaccessible due to terrain limitations or difficulties presented with the use of airborne platforms, such as air traffic congestion or aircraft fuel limitations. The broad perspective from spaceborne platforms is desirable because images that cover thousands of square miles and reveal features which are not recognizable from the Earth's surface or from airborne platforms may be observed.

Imaging of the Earth in the various wavelengths along the spectrum from visible to infra-red to radio frequency regions yields a wide range of information about the Earth's surface structure, physical properties, and environment. Satellite imaging may be accomplished by passive techniques, such as collecting the visible or infra-red radiation which is reflected or emitted by the objects that are being observed, or by active methods, such as radar, which generates radar pulses that are transmitted toward the Earth and received as they are reflected back into space.

For example, satellites such as LANDSAT, a multispectral imaging satellite which provides useful information about the surface of the Earth on a routine and regular basis, have imaging systems that collect image data through a focal plane assembly that are then transmitted through a separately gimballed antenna of a communication system to the Tracking Data Relay Satellite System (TDRSS). Finally, a ground processing facility on the Earth receives the data from the TDRSS and converts it into a useable form.

The separately gimballed antenna and/or aperture of the imaging and communication systems of prior imaging satellites significantly increases the cost and complexity of the imaging satellite spacecraft. Although previous satellite imaging systems have used tape recorders in lieu of communication cross-links in order to reduce the complexity of the satellite spacecraft, the reliability, data rate return and operational inflexibility of tape recorders have imposed other constraints on the utility of the satellite imaging system. Further, the prior imaging systems have been designed for relatively high duty cycle operation, such as 20%-30% (i.e. the satellite performs the imaging function and generates image data over 20%-30% of its orbit), and therefore require extensive solar cell systems to fulfill the imaging system's electrical power requirements. Ultimately, these factors have combined and have contributed to increasing the size and weight of the imaging satellite spacecraft, which is desired to be kept to a minimum, and have reduced the imaging satellite's reliability, which is of great concern because of the unique operating environment in which the satellite is placed.

Recent developments of low cost launch vehicle capabilities, such as those provided by Pegasus-type or Taurus-type launch vehicles, and the availability of solid state mass data storage devices, such as dynamic random-access computer memory, have presented the opportunity to develop a low cost imaging satellite which is capable of providing cost-efficient satellite imaging services for a wide variety of industrial or commercial applications, such as environmental monitoring services, meteorological services, and numerous other satellite imaging applications.

SUMMARY OF THE INVENTION

According to the teachings of the present invention, a dual function imaging and communication system for an imaging satellite is disclosed as having an imaging system which generates digital image data at a relatively low data rate that is stored in a solid state mass data storage device until subsequent transmission by a communication system at a significantly higher data rate. The present invention provides a single antenna or aperture to perform both the imaging and communication functions and may be incorporated as a body mounted payload of an imaging satellite. In addition, the present invention combines and simplifies the imaging and communication systems of the imaging satellite by eliminating the requirement for a separately gimballed antenna and/or aperture for each system. Further, the present invention is designed to operate in a low duty cycle mode to minimize the power supply requirements of the imaging and communication system. Still further, the present invention reduces the weight of the imaging and communication system payload and, at the same time, improves the reliability of the imaging and communication system.

BRIEF DESCRIPTION OF THE DRAWINGS

The various advantages of the present invention will become apparent to one skilled in the art upon reading the following specification, in which.

DESCRIPTION OF THE PREFERRED EMBODIMENTS

It should be understood from the outset that while the following discussion illustrates several particular embodiments of the present invention, these embodiments merely represent a best mode of currently practicing the invention and other modifications may be made to these embodiments without departing from the spirit and scope of the invention.

Figure 1:
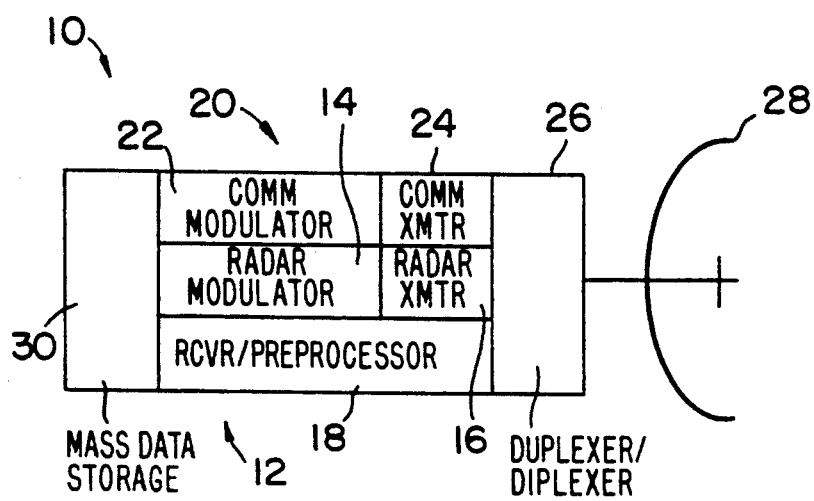
FIG. 1 is a simplified block diagram illustrating a first embodiment of the dual function imaging and communication system of the present invention having separate communication and radar transmitters and a conventional antenna assembly.

FIGS. 1-4 illustrate simplified block diagrams of the various embodiments of the present invention, all of which may be configured for use in a imaging satellite as a body mounted payload. FIG. 1 shows a dual function imaging and communication system 10 where the imaging system is a synthetic aperture radar system 12 having the conventional components of a radar modulator 14, a radar transmitter 16, and a receiver/preprocessor 18. The dual function system 10 also includes a radio communication system 20 having a communication modulator 22 and a communication transmitter 24. A duplexer/diplexer 26 is provided which enables both the radar system 12 and the communication system 20 to utilize a conventional antenna assembly 28. In addition, a solid state mass data storage device 30 is provided to store the image data collected and preprocessed by the radar system 10 prior to its subsequent transmission through the communication system 20.

As an example of the operation of the dual function imaging and communication system 10 of the present invention, the imaging function is accomplished by the radar system 12 which generates radar pulses by means of the radar modulator 14 and the radar transmitter 16 which are transmitted and received through the antenna assembly 28. The radar pulses that are reflected back are received and preprocessed by the receiver/preprocessor 18. The receiver/preprocessor 18 then generates digital image data which are, in turn, stored in the mass data storage device 30. The image data are generated and stored for a prescribed period of time and, upon completion of image data generation, the stored image data are retrieved by the communication system 20 and transmitted as a radio signal by means of the communication modulator 22 and communication transmitter 24.

It should be appreciated that the first embodiment of the present invention, as shown in the simplified block diagram of FIG. 1, employs separate radar and communication transmitters 16, 24 in order to accommodate the different bandwidths which may be required by the radar and/or communication systems.

Figure 2:
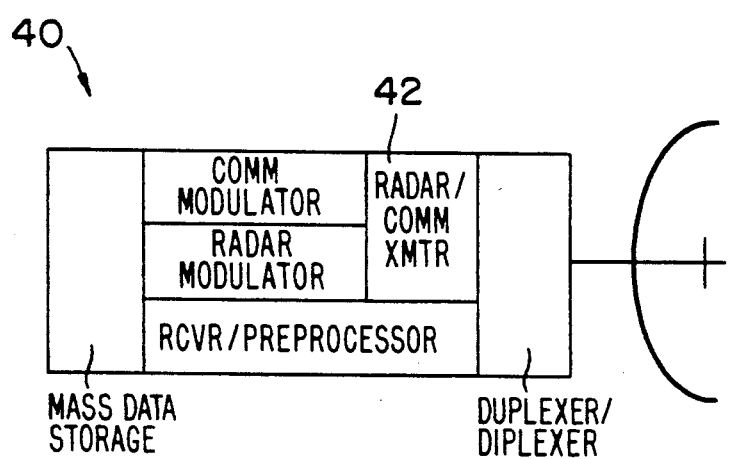
FIG. 2 is a simplified block diagram illustrating a second embodiment of the dual function imaging and communication system of the present invention having a shared communication and radar transmitter.

A second embodiment of the present invention, is shown in the simplified block diagram of FIG. 2 and is similar to the embodiment illustrated in FIG. 1. Here, however, the dual function imaging and communication system 40 utilizes a single transmitter 42 for both radar transmission and communication transmission. It should be appreciated that, in this embodiment, the transmitter 42 may be used for both radar and communication purposes only if the transmitter 42 possesses sufficient bandwidth to accommodate the frequencies of both radar and radio communication.

Figure 3:
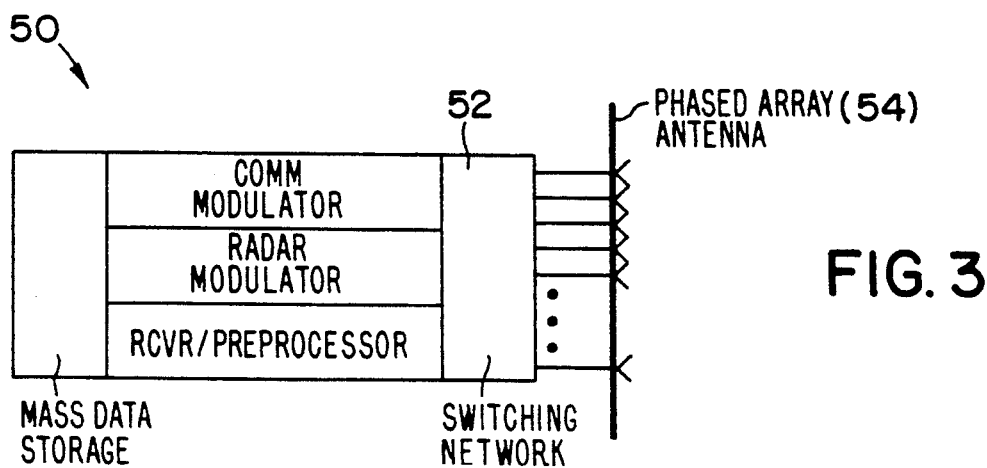
FIG. 3 is a simplified block diagram illustrating a third embodiment of the dual function imaging and communication system of the present invention having a phased array antenna.

Illustrated in FIG. 3 is a simplified block diagram of a third embodiment of the present invention which is also similar to the embodiment disclosed in FIG. 1. However, in this embodiment, the dual function imaging and communication system 50 incorporates a switching network 52 which serves the function of both the transmitter and the duplexer/diplexer and a phased array antenna 54 for radar and radio transmission purposes.

Figure 4:
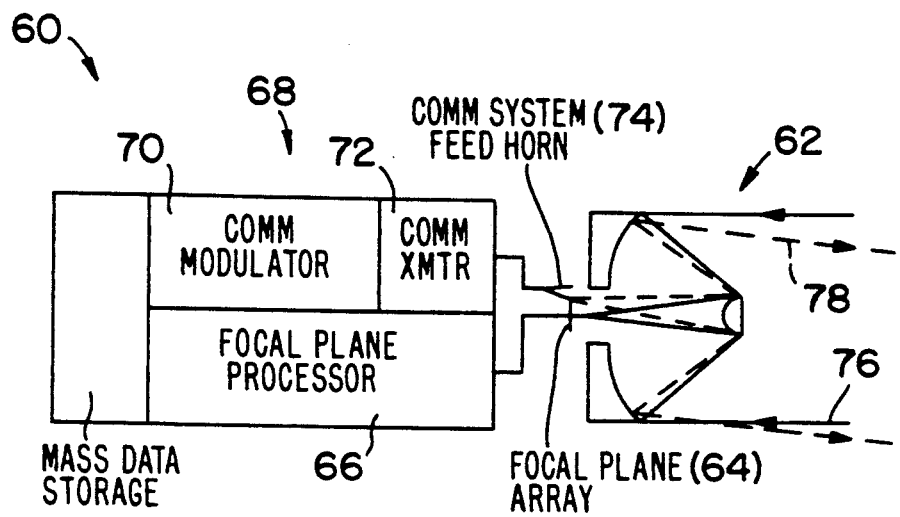
FIG. 4 is a simplified block diagram illustrating a fourth embodiment of the dual function imaging and communication system of the present invention having a dual function telescope.

FIG. 4 shows a simplified block diagram of a fourth embodiment of the present invention where the imaging system is an optical imaging system, such as an infra-red or visible imaging system. In FIG. 4, the dual function imaging and communication system 60 is illustrated as having a telescope assembly 62, including a focal plane array 64, a focal plane processor 66, and a radio communication system 68 having a communication modulator 70, a communication transmitter 72, and a communication system feed horn 74. Here, the telescope assembly 62 is used for both the imaging and communication functions and the focal plane array 64 and the communication system feed horn 74 are used similarly to the duplexer/diplexer 26 of the radar imaging systems 12 of the previous embodiments. Again, the concept of operation here is very similar to that of the first three embodiments which are illustrated in FIGS. 1-3. However, it should be appreciated that, in the present embodiment, the digital image data are generated from visible light or infra-red radiation by means of an optical imaging system, but that the image data are still transmitted in the form of a radio signal.

By way of example, the imaging function begins as visible light is collected by the telescope assembly 62 as illustrated by the solid lines of imaging path 76. The light is focused on the focal plane array 64 and then processed in the focal plane processor 66 where digital image data are generated. The digital image data output of the focal plane processor 66 are stored in the mass data storage device 30 until the data are subsequently retrieved by the communication system 68 for transmission through the communication system feed horn 74 as a radio signal by means of the communication modulator 70 and communication transmitter 72. The transmission of the image data is shown by the dashed lines of the communication path 78.

Figure 5:
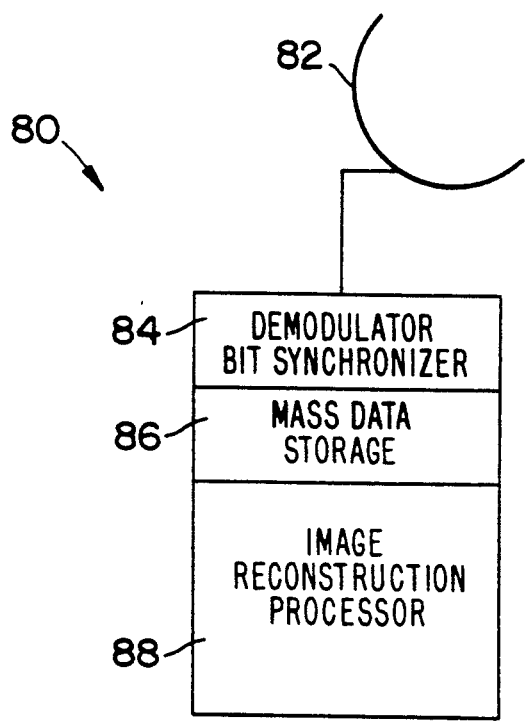
FIG. 5 is a simplified block diagram illustrating a conventional ground receiving station which may be used in combination with the present invention.

In FIG. 5, a simplified block diagram of a typical ground process facility or ground receiving station 80 which may be used in conjunction with an imaging satellite having the dual function imaging and communication system of the present invention is shown. The ground receiving station 80 has a receiving antenna 82, a demodulator bit synchronizer 84, a mass data storage device 86, and an image reconstruction processor 88.

The antenna 82 receives image data from the imaging satellite at a high data rate. The image data is then processed by the demodulator bit synchronizer 84 and is stored or buffered in the mass data storage device 86. From the storage device 86, the data is next processed into a physical image by the image construction processor 88.

The ground receiving station 80 may be located in the area of the satellite imaging operations, or at some other area in another region of the Earth where communication with the satellite may be achieved on a periodic basis.

The operation of the dual function imaging and communication systems 10, 40, 50, 60 as shown in FIGS. 1-4 in an imaging satellite may be illustrated by the following example: As the imaging satellite enters a predetermined orbital position, the satellite spacecraft is oriented so that the antenna assembly 28 (or telescope assembly 62) is positioned to survey a portion of the Earth. The imaging system (i.e. either the radar imaging system 12 or the optical imaging system 62) then operates to generate digital image data at a low data rate for a fixed period of time. In a low duty cycle mode of operation, such as 5%, the duration of image data generation is a period of time of about 5 minutes. In that time, many gigabits of information are generated by the imaging system 12, 62 and are stored in the mass data storage device 30.

Upon termination of image data generation and when the satellite spacecraft reaches a position in its orbit where communication with a ground process facility or ground receiving station 80 is possible, the satellite spacecraft is oriented so that the antenna assembly 28 (or telescope assembly 62) is directed toward the ground receiving station 80.

The image data are retrieved from the mass data storage device 30, which may consist of an arrangement of conventional computer memory modules, such as many gigabits of dynamic random-access memory (DRAM), for example, by the communication system 20, 68 and then transmitted to the ground receiving station 80 by the communication system 20, 68 at a high data rate. It should be appreciated that a low cost imaging satellite spacecraft may be achieved with the combined imaging and communication system of the present invention which uses a single antenna or aperture to perform both the imaging and communication functions. This feature allows for the dual function imaging and communication system to be incorporated into the satellite spacecraft as a body mounted payload, which eliminates the need for complex gimbals and separate pointing subsystems. In addition, the present invention takes advantage of solid state mass data storage technology and incorporates a storage device which may consist of conventional computer random-access memory, such as DRAM. This enables large amounts of preprocessed digital image data to be stored and retrieved without the requirement of moving parts that can break down. Further, the use of the solid state mass data storage device allows the image data which are generated to be stored at a relatively low data rate and to be retrieved at a relatively high data rate, thus eliminating the need for separately gimballed communication down-links which allow simultaneous image data collection and transmission. Also, the imaging and communication system is designed for low duty cycle operation to minimize its electrical power requirements. Still further, the present invention embodies all aspects of image formation including infra-red and visible imaging systems, as well as active and passive radio frequency (RF) imaging systems. In short, the present invention creates a simplified imaging and communication system which contributes to a light-weight and reliable imaging satellite capable of being launched with low cost booster vehicles.

The present invention may be used in imaging satellites having a variety of industrial or commercial applications, such as the infra-red monitoring of specified industrial areas for pollution control; the infra-red or visible monitoring of agricultural resources; the infra-red or visible monitoring for rain forest depletion predictions; the infra-red, visible and/or radar monitoring of oil spills; the radar monitoring of shipping lanes for shipping traffic control; the providing of supplemental imagery for EROS (Earth Resources Observation Satellites) data centers; the remote monitoring of construction sights to assess construction progress against contractual requirements; the remote monitoring of the deployment of fishing fleet assets; and other imaging applications which would seek cost reductions over the costs of monitoring by conventional means.

Various other advantages and modifications will become apparent to one skilled in the art after having the benefit of studying the teachings of the specification, the drawings, and the following claims.

What is claimed is:

1. A dual function satellite imaging and communication system, comprising:

(a) radar imaging means for generating digital image data at a low data rate;
    (b) communication means for transmitting said image data at a high data rate;
    (c) a single antenna means for collecting said image data with said radar imaging means and subsequently transmitting said image data with said communication means; and
    (d) solid state mass data storage means for storing said image data;

said dual function satellite imaging and communication system being incorporable into a body mounted payload of an imaging satellite.

2. The dual function satellite imaging and communication system of claim 1 wherein said radar imaging means comprises a radar transmitter, a receiver/preprocessor and a radar modulator and said communication means comprises a radio communication system having a communication modulator and a communication transmitter.

3. The dual function satellite imaging and communication system of claim 2 wherein said radar transmitter and said communication transmitter are combined in a single transmitter.

4. The dual function satellite imaging and communication system of claim 3 wherein said antenna means comprises a phased array antenna assembly and means for enabling said phased array antenna assembly to service both said radar imaging means and said communication means.

5. The dual function satellite imaging and communication system of claim 4 wherein said single transmitter and said means for enabling said antenna assembly to service both said radar imaging means and said communication means is a switching network.

6. The dual function satellite imaging and communication system of claim 1 wherein said antenna means comprises a parabolic antenna assembly and means for enabling said parabolic antenna assembly to service both said radar imaging means and said communication means.

7. The dual function satellite imaging and communication system of claim 6 wherein said means for enabling said parabolic antenna assembly to service both said imaging means and said communication means comprises a duplexer/diplexer.

8. The dual function satellite imaging and communication system of claim 1 wherein said solid state data storage means comprises at least 60 gigabits of dynamic random-access memory.

9. A dual function satellite imaging and communication system, comprising:

(a) optical imaging means for generating digital image data at a low data rate, said optical imaging means having a focal plane processor;
    (b) communication means for transmitting said image data at a high data rate;
    (c) a single aperture means for collecting said image data with said optical imaging means and subsequently transmitting said image data with said communication means; and
    (d) solid state mass data storage means for storing said image data;

said dual function satellite imaging and communication system being incorporable into a body mounted payload of an imaging satellite.

10. The dual function satellite imaging and communication system of claim 9 wherein said optical imaging means comprises an infra-red imaging system.

11. The dual function satellite imaging and communication system of claim 9 wherein said optical imaging means comprises a visible imaging system.

12. The dual function satellite imaging and communication system of claim 9 wherein said communication means comprises a radio communication system having a communication modulator, communication transmitter and a communication system feed horn, said communication system being capable of transmitting said image data at a rate of 1600 megabits per second.

13. The dual function satellite imaging and communication system of claim 9 wherein said aperture means comprises a telescope assembly, said telescope assembly having a focal plane array.

14. The dual function satellite imaging and communication system of claim 9 wherein said solid state data storage means comprises at least 60 gigabits of dynamic random-access memory.

15. A method of imaging from a satellite spacecraft of the type having a body-mounted, dual function imaging and communication system which comprises an imaging system for generating digital image data, a communication system for transmitting said digital image data, a single antenna assembly for servicing both said imaging system and said communication system, and solid state mass data storage means for storing said digital image data, said method comprising the steps of:

(a) orienting said satellite spacecraft in a first direction whereby said antenna assembly is positioned to survey an object;

(b) generating digital image data of said object at a first rate by means of said imaging system for a first period of time;

(c) storing said digital image data in said solid state mass data storage means;

(d) orienting said satellite spacecraft in a second direction whereby said antenna assembly is positioned to contact a ground receiving station; and (e) transmitting said digital image data to said ground receiving station at a second rate by means of said communication system for a second period of time.

16. The method of claim 15 wherein said first period of time is approximately 5 minutes and said second period of time is approximately 35–40 seconds.

* * * * *